United States Patent [19]
Orlen et al.

[11] Patent Number: 5,654,734
[45] Date of Patent: Aug. 5, 1997

[54] METHOD AND APPARATUS FOR RECEIVING AND PROCESSING COMPRESSED IMAGE DATA FOR PRESENTATION BY AN ACTIVE ADDRESSED DISPLAY

[75] Inventors: Noah Paul Orlen, Boca Raton; Ali Saidi, Boynton Beach, both of Fla.

[73] Assignee: Motorola, Inc., Schaumburg, Ill.

[21] Appl. No.: 451,689

[22] Filed: May 26, 1995

Related U.S. Application Data

[63] Continuation of Ser. No. 58,893, May 10, 1993, abandoned.

[51] Int. Cl.$^6$ ........................................................ G09G 3/36
[52] U.S. Cl. ............................ 345/78; 345/100; 345/202
[58] Field of Search ............................ 345/87, 94, 95, 345/96, 98, 100, 103, 202; 359/54, 55; 340/825.44; 382/252, 248, 276, 281; 364/725

[56] References Cited

U.S. PATENT DOCUMENTS

| | | | |
|---|---|---|---|
| 3,815,090 | 6/1974 | Muenchhausen | 382/43 |
| 4,506,955 | 3/1985 | Kmetz | 345/94 |
| 4,807,042 | 2/1989 | Tanaka | 364/725 |
| 4,952,036 | 8/1990 | Gulick et al. | |
| 5,060,036 | 10/1991 | Choi | |
| 5,268,853 | 12/1993 | Tanaka | 364/725 |

OTHER PUBLICATIONS

Terry Scheffer and Jurgen Nehring, "Supertwisted Nematic (STN) LCDs," May 17, 1992, paper submitted to 1992 SID International Symposium, Boston, Massachusetts.

Related European Patent Application o. 92102353.7, filed Feb. 12, 1992 by Scheffer et al.

*Primary Examiner*—Xiao Wu
*Attorney, Agent, or Firm*—Kelly A. Gardner

[57] ABSTRACT

A communication system (500) for transmitting and receiving radio frequency (RF) signals includes a base station (505) for transmitting an RF signal including at least compressed data and a plurality of correction factors, wherein the compressed data includes two-dimensional transformed image data which has been compressed by the base station (505) utilizing a plurality of orthogonal functions. The communication system (500) further includes a data communication receiver (510) coupled to the base station (505) for receiving the RF signal and for generating one-dimensional transformed image data therefrom by performing a one-dimensional transformation of the two-dimensional transformed image data utilizing the plurality of orthogonal functions. The data communication receiver (510) includes a controller (1025) for adding the plurality of correction factors to the one-dimensional transformed image data to generate a plurality of column signals which drive an active-addressed, rms-responding display (100).

21 Claims, 6 Drawing Sheets

$$\begin{bmatrix} 1 & 1 & 1 & 1 & 1 & 1 & 1 & 1 \\ 1 & 1 & 1 & 1 & -1 & -1 & -1 & -1 \\ 1 & 1 & -1 & -1 & -1 & -1 & 1 & 1 \\ 1 & 1 & -1 & -1 & 1 & 1 & -1 & -1 \\ 1 & -1 & -1 & 1 & 1 & -1 & -1 & 1 \\ 1 & -1 & -1 & 1 & -1 & 1 & 1 & -1 \\ 1 & -1 & 1 & -1 & -1 & 1 & -1 & 1 \\ 1 & -1 & 1 & -1 & 1 & -1 & 1 & -1 \end{bmatrix}$$

METHOD AND APPARATUS FOR RECEIVING AND PROCESSING COMPRESSED IMAGE DATA FOR PRESENTATION BY AN ACTIVE ADDRESSED DISPLAY

This is a continuation of application Ser. No. 08/058,893 filed May 10, 1993, now abandoned.

FIELD OF THE INVENTION

This invention relates in general to receiving and displaying image data, and more specifically to receiving and processing compressed image data for presentation by an active-addressed display.

BACKGROUND OF THE INVENTION

An example of a direct multiplexed, rms (root mean square) responding electronic display is the well-known liquid crystal display (LCD). In such a display, a nematic liquid crystal material is positioned between two parallel glass plates having electrodes applied to each surface in contact with the liquid crystal material. The electrodes typically are arranged in vertical columns on one plate and horizontal rows on the other plate for driving a picture element (pixel) wherever a column and row electrode overlap.

In rms-responding displays, the optical state of a pixel is substantially responsive to the square of the voltage applied to the pixel, i.e., the difference in the voltages applied to the electrodes on the opposite sides of the pixel. LCDs have an inherent time constant that characterizes the time required for the optical state of a pixel to return to an equilibrium state after the optical state has been modified by changing the voltage applied to the pixel. Recent technological advances have produced LCDs with time constants (approximately 16.7 milliseconds) approaching the frame period used in many video displays. Such a short time constant allows the LCD to respond quickly and is especially advantageous for depicting motion without noticeable smearing or flickering of the displayed image.

Conventional direct multiplexed addressing methods for LCDs encounter a problem when the display time constant approaches the frame period. The problem occurs because conventional direct multiplexed addressing methods subject each pixel to a short duration "selection" pulse once per frame. The voltage level of the selection pulse is typically 7–13 times higher than the rms voltages averaged over the frame period. The optical state of a pixel in an LCD having a short time constant tends to return towards an equilibrium state between selection pulses, resulting in lowered image contrast, because the human eye integrates the resultant brightness transients at a perceived intermediate level. In addition, the high level of the selection pulse can cause alignment instabilities in some types of LCDs.

To overcome the above-described problems, an "active addressing" method for driving rms responding electronic displays has been developed. The active addressing method continuously drives the row electrodes with signals comprising a train of periodic pulses having a common period T corresponding to the frame period. The row signals are independent of the image to be displayed and preferably are orthogonal and normalized, i.e., orthonormal. The term "orthogonal" denotes that, if the amplitude of a signal applied to one of the rows is multiplied by the amplitude of a signal applied to another one of the rows, the integral of this product over the frame period is zero. The term "normalized" denotes that all the row signals have the same rms voltage integrated over the frame period T.

During each frame period a plurality of signals for the column electrodes are calculated and generated from the collective state of the pixels in each of the columns. The column voltage at any time t during the frame period is proportional to the sum obtained by considering each pixel in the column, multiplying a "pixel value" representing the optical state (either −1 for fully "on", +1 for fully "off", or values between −1 and +1 for proportionally corresponding gray shades) of the pixel by the value of that pixel's row signal at time t, and adding the products obtained thereby to the sum.

If driven in the active addressing manner described above, it can be shown mathematically that there is applied to each pixel of the display an rms voltage averaged over the frame period, and that the rms voltage is proportional to the pixel value for the frame. The advantage of active addressing is that it restores high contrast to the displayed image because, instead of applying a single, high level selection pulse to each pixel during the frame period, active addressing applies a plurality of much lower level (2–5 times the rms voltage) selection pulses spread throughout the frame period. In addition, the much lower level of the selection pulses substantially reduces the probability of alignment instabilities. As a result, utilizing an active addressing method, rms responding electronic displays, such as LCDs utilized in portable radio devices, can display image data at video speeds without smearing or flickering. Additionally, LCDs driven with an active addressing method can display image data having multiple shades without the contrast problems present in LCDs driven with conventional multiplexed addressing methods.

Therefore, with the advent of active addressing methods, there exists an opportunity to develop an over-the-air communication system in which image data can be transmitted, using known data compression techniques, to a portable radio device. The portable radio device could thereafter decompress and display the image data on a conventional LCD driven with active addressing methods such as described above. However, most data compression and decompression techniques involve a large number of complex calculations, which can be performed by either software or hardware. Similarly, implementation of active addressing methods also involves complex calculations to calculate and generate the column signals applied to pixels in the columns of the LCD. These known data decompression and active addressing methods, therefore, would increase the amount of circuitry needed within a portable radio device, thereby increasing the size of the device and decreasing the battery life of the device, both of which are considered very undesirable from a consumer standpoint.

Thus, what is needed is a portable radio device in which image data can be decompressed and displayed without increasing the size of the radio device due to required decompression and addressing circuitry. Additionally, reduction in the battery life of the radio device should be minimized.

SUMMARY OF THE INVENTION

According to an aspect of the present invention, a method for generating signals for driving an active-addressed, rms-responding display included in a data communication receiver comprises the step of receiving compressed data including at least previously transformed image data which has been compressed in a two-dimensional transformation utilizing a plurality of orthogonal functions. The method further comprises the step of performing a one-dimensional transformation of the previously transformed image data utilizing the plurality of orthogonal functions, wherein the one-dimensional transformation results in one-dimensional transformed image data. Thereafter, a plurality of correction factors is added to the one-dimensional transformed image data to generate column signals for driving a first portion of pixels included in the rms-responding display.

According to another aspect of the present invention, a data communication receiver for receiving radio frequency (RF) signals and for displaying information contained therein on an active-addressed, rms-responding display comprises a receiver for receiving an RF signal including at least compressed data and a plurality of correction factors, wherein the compressed data includes previously transformed image data which has been compressed in a two-dimensional transformation utilizing a plurality of orthogonal functions. A transformation circuit coupled to the receiver utilizes the plurality of orthogonal functions to perform a one-dimensional transformation on the previously transformed image data, thereby generating one-dimensional transformed image data, and signal generating means coupled to the transformation circuit adds the plurality of correction factors to the one-dimensional transformed image data to generate a plurality of column signals for driving a first portion of pixels included in the rms-responding display.

According to still another aspect of the present invention, a communication system for transmitting and receiving radio frequency (RF) signals comprises a base station for transmitting an RF signal including at least compressed data and a plurality of correction factors, wherein the compressed data includes two-dimensional transformed image data which has been compressed by the base station utilizing a plurality of orthogonal functions. The communication system further comprises a data communication receiver coupled to the base station for receiving the RF signal and for generating one-dimensional transformed image data therefrom by performing a one-dimensional transformation of the two-dimensional transformed image data utilizing the plurality of orthogonal functions. The data communication receiver comprises signal generating means for adding the plurality of correction factors to the one-dimensional transformed image data to generate a plurality of column signals and an rms-responding display coupled to the signal generating means, wherein the rms-responding display has a first portion of pixels which are driven by the plurality of column signals in accordance with active addressing techniques.

DESCRIPTION OF A PREFERRED EMBODIMENT

Figure 1:
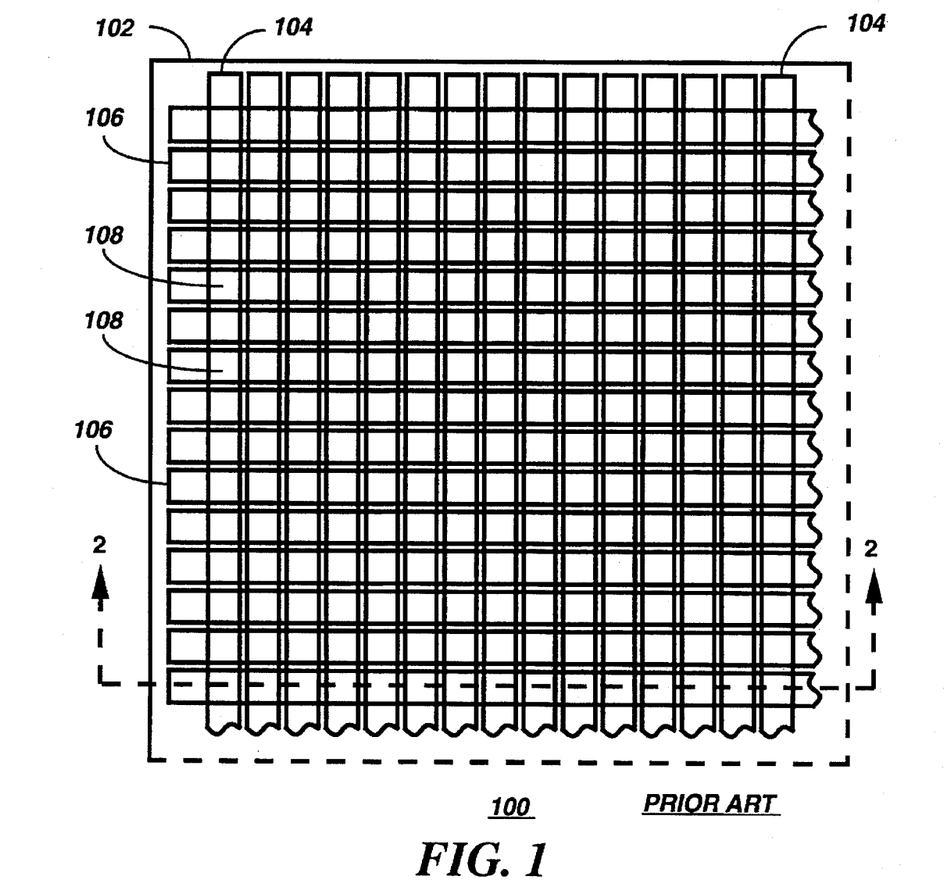
FIG. 1 is a front orthographic view of a portion of a conventional liquid crystal display.
Figure 2:
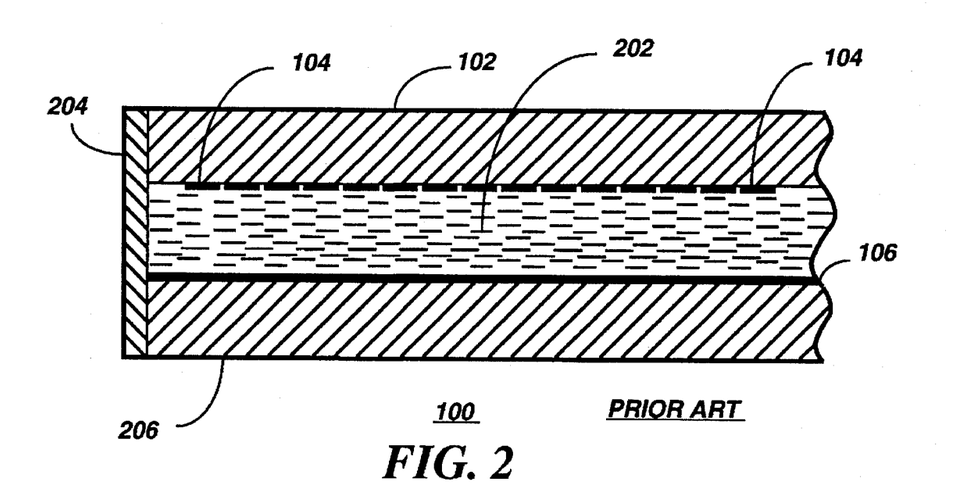
FIG. 2 is an orthographic cross-section view along the line 2—2 of FIG. 1 of the portion of the conventional liquid crystal display.

Referring to FIGS. 1 and 2, orthographic front and cross-section views of a portion of a conventional liquid crystal display (LCD) 100 depict first and second transparent substrates 102, 206 having a space therebetween filled with a layer of liquid crystal material 202. A perimeter seal 204 prevents the liquid crystal material from escaping from the LCD 100. The LCD 100 further includes a plurality of transparent electrodes comprising row electrodes 106 positioned on the second transparent substrate 206 and column electrodes 104 positioned on the first transparent substrate 102. At each point at which a column electrode 104 overlaps a row electrode 106, such as the overlap 108, voltages applied to the overlapping electrodes 104, 106 can control the optical state of the liquid crystal material 202 therebetween, thus forming a controllable picture element, hereafter referred to as a "pixel". While an LCD is the preferred display element in accordance with the preferred embodiment of the present invention, it will be appreciated that other types of display elements may be used as well, provided that such other types of display elements exhibit optical characteristics responsive to the square of the voltage applied to each pixel, similar to the root mean square (rms) response of an LCD.

Figure 3:
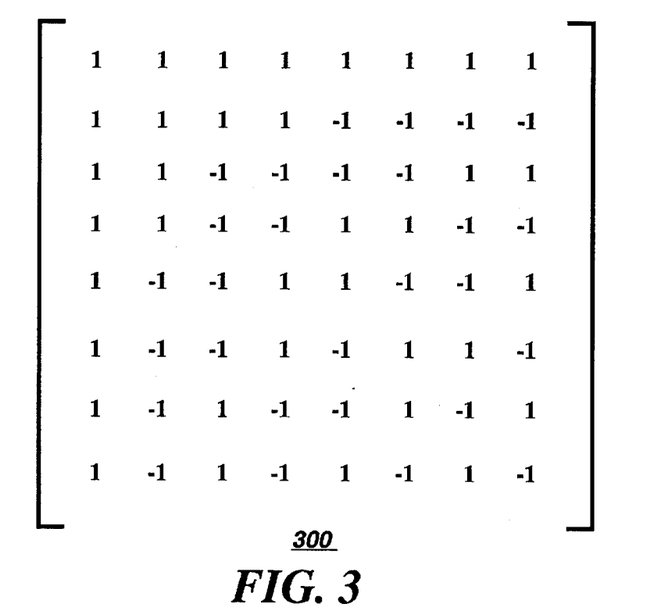
FIG. 3 is a matrix of Walsh functions in accordance with the present invention.
Figure 4:
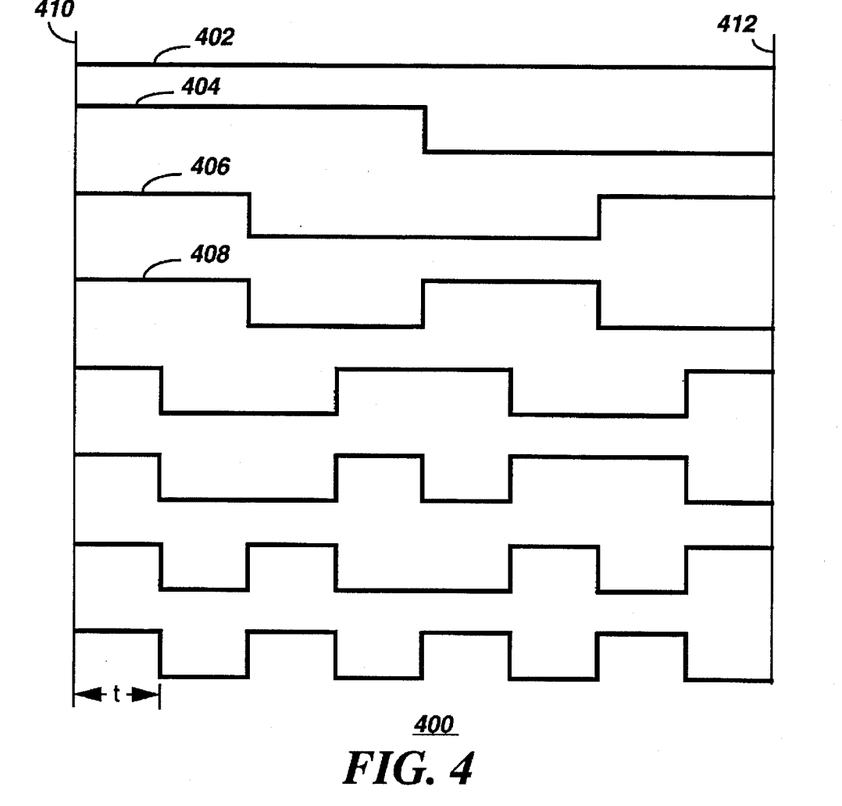
FIG. 4 depicts drive signals corresponding to the Walsh functions of FIG. 3 in accordance with the present invention.

Referring to FIGS. 3 and 4, an eight-by-eight (third order) matrix of Walsh functions 300 and the corresponding Walsh waves 400 in accordance with the preferred embodiment of the present invention are shown. Walsh functions are both orthogonal and normalized, i.e., orthonormal, and are therefore preferable for use in an active-addressed display system, as briefly discussed in the Background of the Invention herein above. It may be appreciated by one of ordinary skill in the art that other classes of functions, such as Pseudo Random Binary Sequence (PRBS) functions or Direct Cosine Transform (DCT) functions, may also be utilized in active-addressed display systems.

When Walsh functions are used in an active-addressed display system, voltages having levels represented by the Walsh waves 400 are uniquely applied to a selected plurality of electrodes of the LCD 100. For example, the Walsh waves 404, 406, and 408 could be applied to the first (uppermost), second and third row electrodes 106, respectively, and so on. In this manner, each of the Walsh waves 400 would be applied uniquely to a corresponding one of the row electrodes 106. It is preferable not to use the Walsh wave 402 in an LCD application because the Walsh wave 402 would bias the LCD 100 with an undesirable DC voltage.

It is of interest to note that the values of the Walsh waves 400 are constant during each time slot t. The duration of the time slot t for the eight Walsh waves 400 is one-eighth of the duration of one complete cycle of Walsh waves 400 from start 410 to finish 412. When using Walsh waves for actively addressing a display, the duration of one complete cycle of the Walsh waves 400 is set equal to the frame duration, i.e., the time to receive one complete set of data for controlling all the pixels 108 of the LCD 100. The eight Walsh waves 400 are capable of uniquely driving up to eight row electrodes 106 (seven if the Walsh wave 402 is not used). It will be appreciated that a practical display has many more rows. For example, displays having four-hundred-eight rows and six-hundred-forty columns are widely used today in laptop computers. Because Walsh function matrices are available in complete sets determined by powers of two, and because the orthonormality requirement for active addressing does not allow more than one electrode to be driven from each Walsh wave, a five-hundred-twelve by five-hundred-twelve ($2^9 \times 2^9$) Walsh function matrix would be required to drive a display having four-hundred-eighty row electrodes 106. For this case, the duration of the time slot t is $1/512$ of the frame duration. Four-hundred-eight Walsh waves would be used to drive the four-hundred-eighty row electrodes 106, while the remaining thirty-two, preferably including the first Walsh wave 402 having a DC bias, would be unused.

Figure 5:
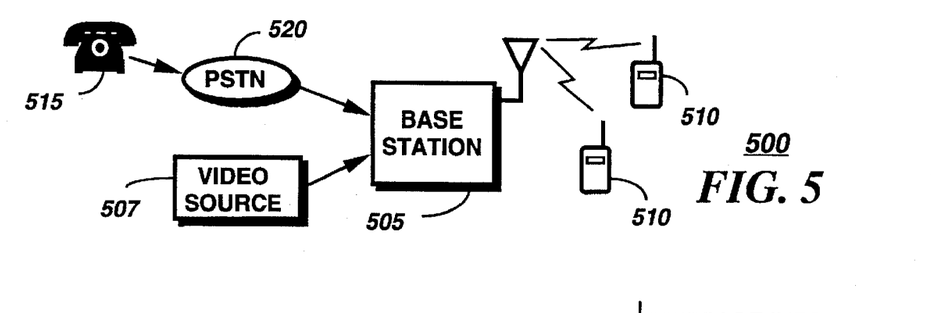
FIG. 5 is an illustration of a radio communication system comprising a base station for transmitting compressed image data to data communication receivers in accordance with the present invention.

Referring next to FIG. 5, a radio communication system 500 comprises a base station 505 for transmitting radio frequency (RF) signals to data communication receivers 510 located within the coverage area thereof. According to the present invention, the base station 505 is capable of receiving image data from a video source 507, such as a video camera. The base station 505 periodically compresses and encodes the image data for transmission as an RF signal. The data communication receivers 510, which may be, for example, pagers or other portable radio devices, receive the RF signal and display the information contained therein on active-addressed display devices, such as the LCD 100 (FIG. 1). It may be appreciated that, in addition to transmitting image data, the base station 505 may also transmit message information received from a conventional wired telephone set 515 via a telephone network, e.g., the Public Switched Telephone Network (PSTN) 520, or from another data entry device.

When the data communication receivers 510 are portable radio devices, such as pagers or two-way radios, size is of great concern because users typically prefer lightweight, streamlined portable radio devices which are not too bulky and do not interfere with clothing, pocketbooks, etc. Furthermore, battery life is very important because users of portable radio devices do not want to be inconvenienced by having to often replace batteries, which are sometimes expensive. Therefore, in accordance with the preferred embodiment of the present invention, the data communication receivers 510 process received RF signals in such a manner that complex data decompression circuitry is not required, thereby preventing unnecessary increases in size or decreases in battery life.

Figure 6:
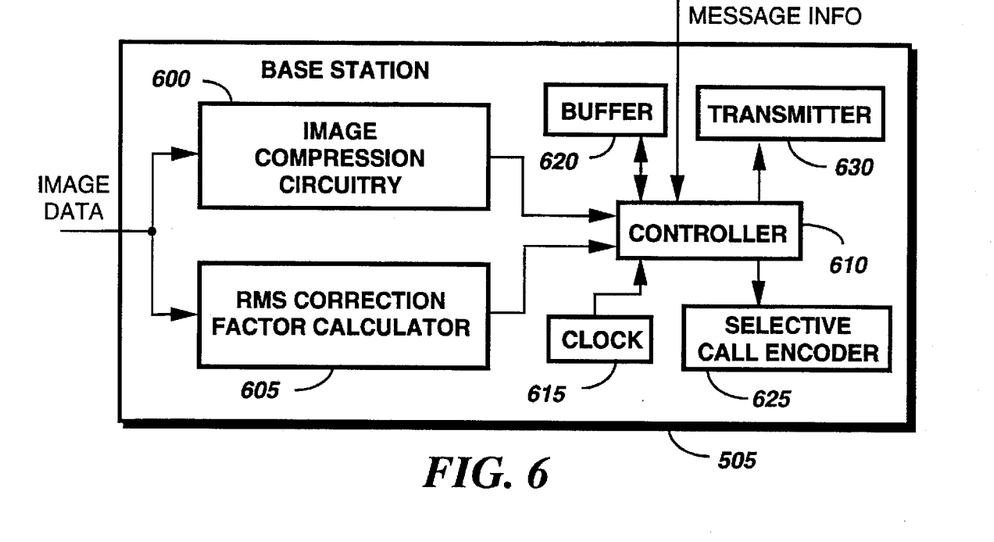
FIG. 6 is an electrical block diagram of the base station of FIG. 5 for compressing image data for radio frequency transmission in accordance with the present invention.

With reference to FIG. 6, an electrical block diagram of the base station 505 is depicted. In accordance with the preferred embodiment of the present invention, the base station 505 comprises image compression circuitry 600, which will be explained in greater detail herein below, for receiving and compressing image data provided by the video source 507 (FIG. 5). Additionally, the base station 505 comprises an rms correction factor calculator 605 for calculating correction factors utilized in the driving of an active-addressed LCD 100 included in a data communication receiver 510. Circuits and techniques for performing the rms correction factor calculation are taught in the U.S. Patent Application entitled "Method and Apparatus for Driving an Electronic Display" by Herold, Attorney's Docket No. PT00843U, which is assigned to the assignee of the present invention, and which is hereby incorporated by reference.

The base station 505 further includes a controller 610, such as an MC68HC05 microcomputer manufactured by Motorola, Inc. of Schaumburg, Ill., for controlling the operation of the rms correction factor calculator 605 and for receiving the rms correction factors therefrom and the compressed data from the image compression circuitry 600. Coupled to the controller 610 is a clock 615 for providing real time values utilized in system timing and a buffer 620 for temporarily storing data, such as the compressed data and the rms correction factors. Additionally, a selective call encoder 625 is coupled to the controller 610 for encoding the compressed data and the rms correction factors associated therewith into a suitable paging format, such as POCSAG (Post Office Code Standardization Advisory Group) or GSC (Golay Sequential Code). A transmitter 630 is thereafter employed to transmit the encoded information in a conventional manner.

If, as described above, the radio communication system 500 is a paging system, the controller 610 may further comprise a data port (not shown) for receiving message information from a telephone network or other data entry device. This information is, similar to the compressed data and the rms correction factors, transmitted as an RF signal. It may be appreciated that delineating marks, such as predetermined sequences of binary bits, for example, can be utilized to delineate the beginnings and ends of the various fields of information, i.e., the message information, the rms correction factors, and the compressed data, transmitted in the RF signal. Alternatively, when the length of each field of information is fixed, such as when the number of bits of compressed data does not vary, delineating marks may not be necessary.

When the radio communication system 500 is a paging system, sections of the base station 505 can be implemented using a conventional paging terminal. For instance, the Model No. N1056BA radio paging terminal, manufactured by Motorola, Inc. of Schaumburg, Illinois, may be used to implement the controller 610, the clock 615, the buffer 620, the selective call encoder 625, and the transmitter 630.

Figure 7:
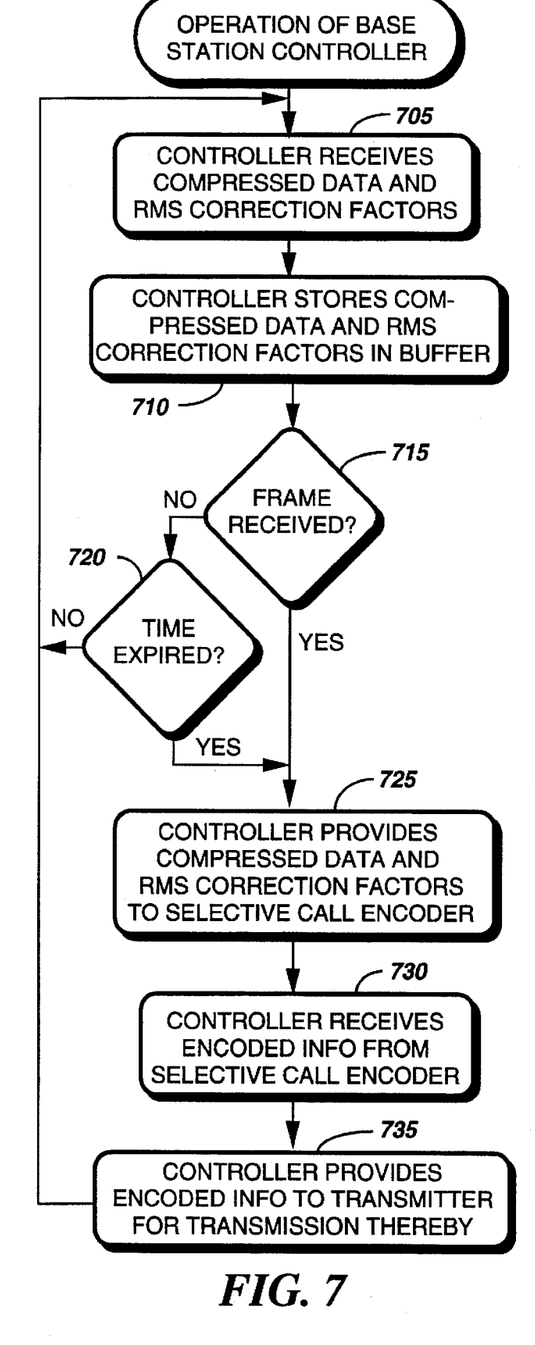
FIG. 7 is a flow chart depicting the operation of a controller included in the base station of FIG. 5 in accordance with the present invention.

FIG. 7 is a flow chart depicting the operation of the base station controller 610 (FIG. 6) in accordance with the preferred embodiment of the present invention. As described above, the controller 610 receives, at step 705, the compressed data from the image compression circuitry 600 and the rms correction factors from the rms correction factor calculator 605. The compressed data and the rms correction factors associated therewith are temporarily stored, at step 710, in the buffer 620 (FIG. 6) until an entire frame of data is received, at step 715, or until a predetermined time has expired, at step 720. Subsequently, the compressed data and the rms correction factors are provided, at step 725, to the selective call encoder 625 for encoding into a suitable paging format. In response to receiving, at step 730, the encoded information from the selective call encoder, the controller 610 provides, at step 735, the encoded information to the transmitter 630 for transmission thereby as an RF signal.

Figure 8:
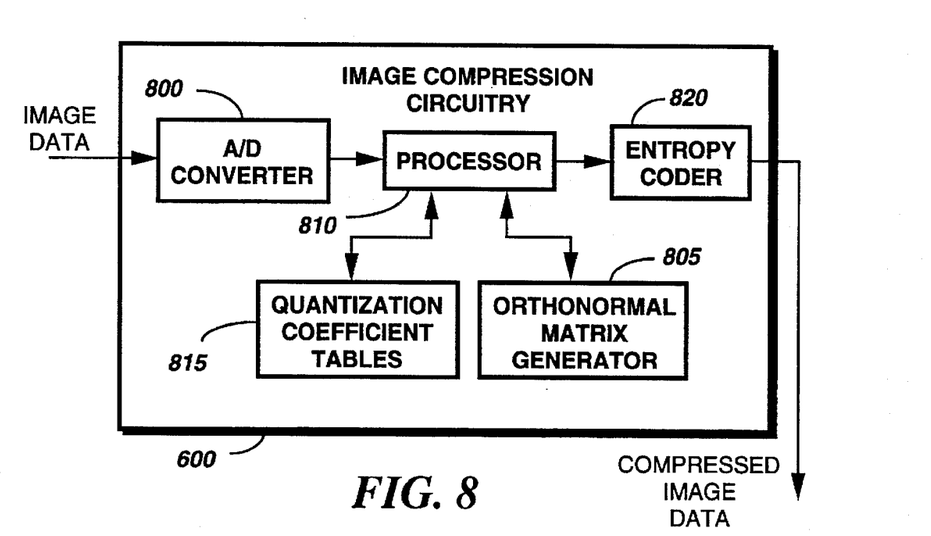
FIG. 8 is an electrical block diagram of image compression circuitry included in the base station of FIG. 5 in accordance with the present invention.

Referring next to FIG. 8, an electrical block diagram of the image compression circuitry 600 in accordance with the preferred embodiment of the present invention is depicted.

Preferably, the image compression circuitry 600 comprises an analog-to-digital (A/D) converter 800 for receiving the image data and converting it to digital image data. The resolution and range of the A/D converter 800 is determined by the desired image to be displayed on the LCD 100 (FIG. 1) included in the data communication receiver 510. For example, if the pixels 108 of the LCD 100 are to be either fully "on" or fully "off", the A/D converter 800 may convert the image data to binary data, wherein −1 represents fully on and +1 represents fully off. If gray shades are also to be displayed on the LCD 100, the A/D converter 800 may generate values between −1 and +1 for the gray shades.

The image compression circuitry 600 further comprises a matrix generator 805 for generating a matrix having orthogonal characteristics. Additionally, in accordance with the preferred embodiment, the matrix is normalized. Therefore, the matrix generator 805 is referred to as an "orthonormal matrix generator". The orthonormal matrix generator 805 generates a plurality of orthonormal functions represented by a matrix, such as the Walsh function matrix 300 (FIG. 3), although matrices of other orthogonal and normalized functions, such as DCT functions, may also be generated. The number of rows included in the generated matrix preferably is greater than or equal to the number of rows included in the LCD 100.

Further included in the image compression circuitry 600 is a processor 810 coupled to the A/D converter 800 and the orthonormal matrix generator 805 for utilizing the generated matrix to perform a two-dimensional transformation of the digital image data by performing a predetermined algorithm. One such algorithm involves the use of matrix multiplication and can be represented by the following equation:

$$I_{2D} = OM_1 * I * OM_1,$$

wherein $I_{2D}$ represents the two-dimensional transformed image data, I represents the digital image data, and $OM_1$ represents the orthonormal matrix generated by the orthonormal matrix generator 805. It will be appreciated that, when matrix multiplication is used, the order of the terms in the above-recited equation cannot be varied. One of ordinary skill in the art will recognize that there are many fast, efficient algorithms, such as Walsh Transforms, Fast Fourier Transforms, or modifications thereof, which can be used to transform the image data.

Coupled to the processor 810 are quantization coefficient tables 815 for storing coefficients utilized by the processor 810 in quantizing the two-dimensional transformed image data in a conventional manner. Also, a conventional entropy coder 820 is coupled to the processor 810 for coding the quantized data to generate the compressed data. The entropy coder 820 preferably utilizes a well known coding scheme, such as Huffman coding, wherein the quantized data is coded depending upon the probability of occurrence of the source code words.

The image compression circuitry 600 may be implemented, for example, by the CL550-30 image compression/decompression chip manufactured by C-Cube Microsystems of San Jose, Calif., which utilizes DCT functions for two-dimensionally transforming the image data. It will be appreciated that hard-wired logic or other conventional image compression chips which are capable of performing equivalent operations may be alternatively utilized.

Figure 9:
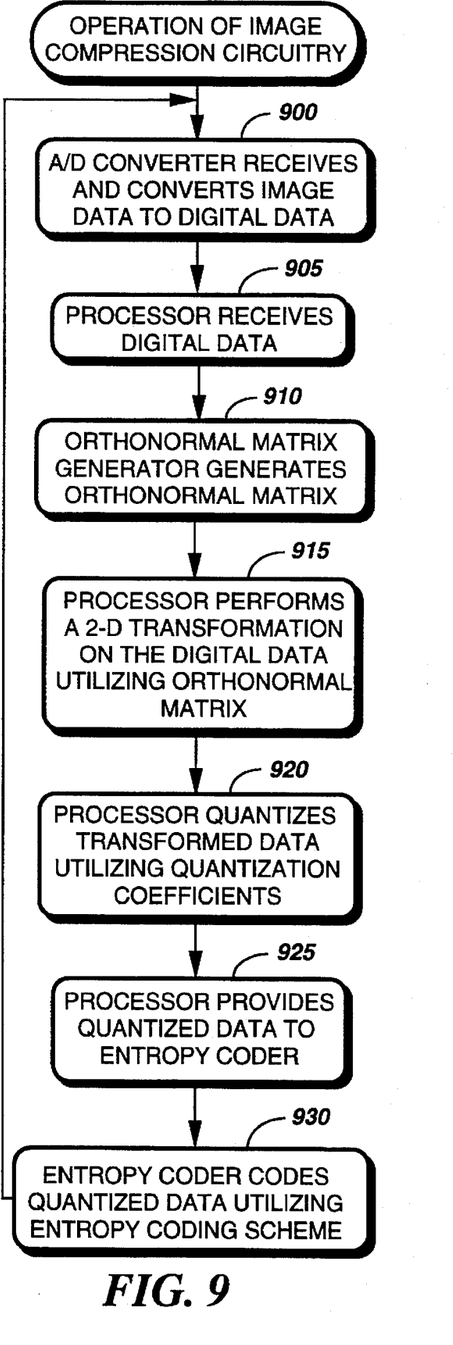
FIG. 9 is a flow chart depicting the operation of the image compression circuitry of FIG. 8 in accordance with the present invention.

FIG. 9 is a flow chart depicting the operation of the image compression circuitry 600 (FIG. 8). Initially, the A/D converter 800 receives and converts, at step 900, the analog image data to digital image data, subsequent to which the processor 810 is provided with the digital image data, at step 905. As described above, the processor 810 is further provided with a plurality of orthonormal functions, perhaps in the form of an orthonormal matrix, generated, at step 910, by the orthonormal matrix generator 805. Thereafter, the processor 810 operates on the digital image data to perform, at step 915, a two-dimensional transformation of the image data utilizing the orthonormal functions represented by the orthonormal matrix. The processor 810 next quantizes, at step 920, the two-dimensional transformed image data in a manner well known to one of ordinary skill in the art. The quantized image data is provided, at step 925, to the entropy coder 820 for processing thereby to result in the compressed data, at step 930. As described above, the compressed data is then encoded, along with the rms correction factors, into a suitable paging format for subsequent transmission as an RF signal. The RF signal is received by a data communication receiver 510, as may be better understood by referring to FIG. 10.

Figure 10:
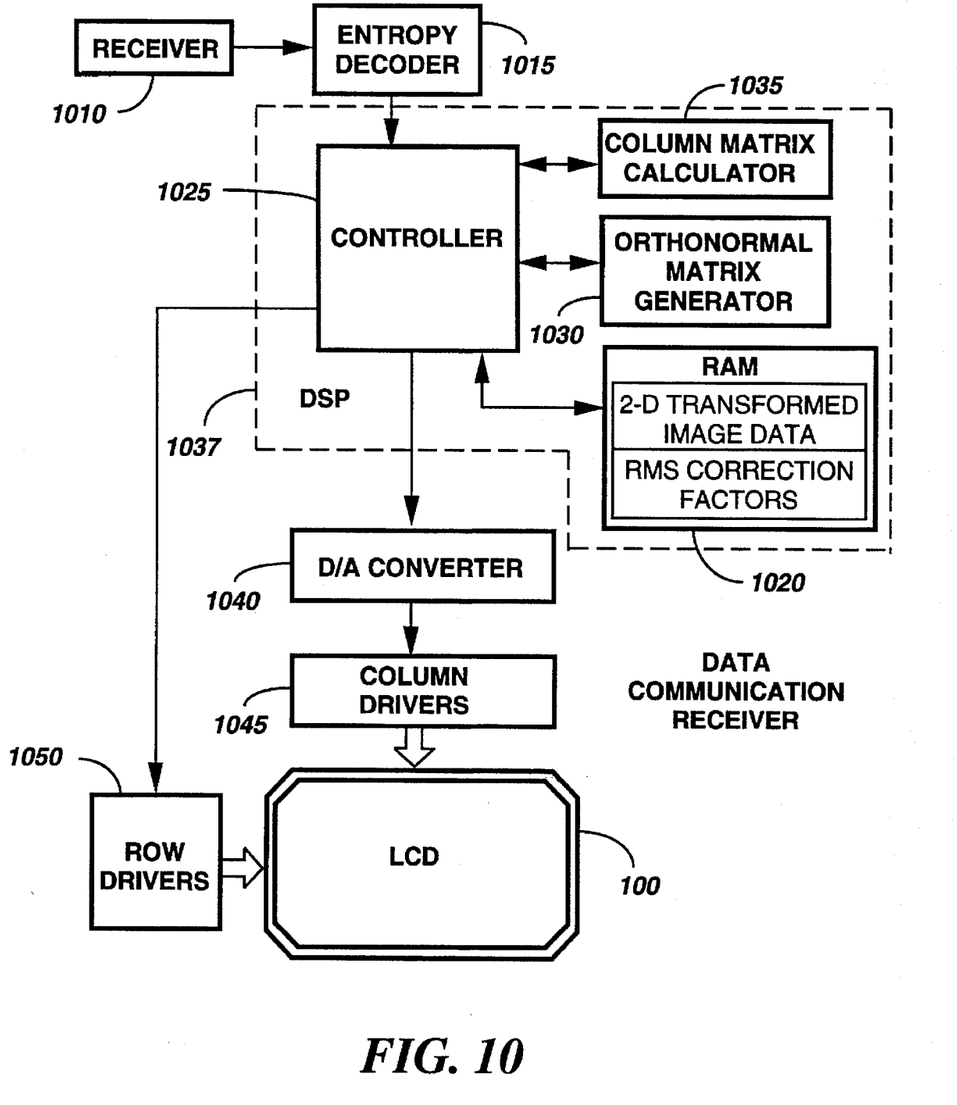
FIG. 10 is an electrical block diagram of the data communication receiver of FIG. 5 for receiving and processing the compressed image data from the base station of FIG. 5 in accordance with the present invention.

FIG. 10 is an electrical block diagram of the data communication receiver 510. Preferably, the data communication receiver 510 comprises a receiver 1010 for receiving and demodulating the RF signal and a conventional entropy decoder 1015, such as the one included in the CL550-30 chip referred to herein above, for decoding the rms correction factors and the two-dimensional transformed image data included in the RF signal. The data communication receiver 510 preferably further comprises a memory, such as a random access memory (RAM) 1020 for temporarily storing the rms correction factors and the two-dimensional transformed image data until an entire frame of data has been received.

A controller 1025 coupled to the RAM 1020 controls the operation of the data communication receiver 510. Coupled to the controller 1025 is an orthonormal matrix generator 1030 for generating an orthonormal, i.e., orthogonal and normalized, matrix of functions. This orthonormal matrix, $OM_2$, is, in accordance with the preferred embodiment of the present invention, generated utilizing the same type of functions, e.g., PRBS, Walsh, DCT, etc., utilized by the image compression circuitry 600 (FIG. 6) of the base station 505 described above. Additionally, the orthonormal matrix should be of the same size as the orthonormal matrix generated by the image compression circuitry 600. A column matrix calculator 1035 coupled to the controller 1025 utilizes the orthonormal matrix to perform a one-dimensional inverse transformation of the two-dimensional transformed image data, thus yielding one-dimensional transformed image data, which may be represented by a column matrix. The controller 1025 then adds the rms correction factors to the column matrix to generate column signals for driving the LCD 100. The column matrix calculator 1035, the orthonormal matrix generator 1030, the RAM 1020, and the controller 1025 may be, for example, included in a digital signal processor (DSP) 1037, such as model number DSP56000 manufactured by Motorola, Inc. of Schaumburg, Ill., or implemented by hard wired circuitry which performs equivalent operations.

Because the matrix $OM_1$ utilized by the image compression circuitry 600 is orthogonal and the matrix $OM_2$ utilized by the column matrix calculator 1035 is orthogonal, the matrices have the characteristic that each matrix is equal to its inverse, i.e., $OM_1 = 1/OM_1$ and $OM_2 = 1/OM_2$. Additionally, because each of the matrices are generated utilizing the same type of functions, as described above, the matrices are equivalent, i.e., $OM_1 = OM_2$. Therefore, when matrix multiplication is utilized by the column matrix calculator 1035, the one-dimensional inverse transform can be simply accomplished by multiplying the two-dimensional transformed image data by the orthonormal matrix $OM_2$ generated by the orthonormal matrix generator 1030. One of ordinary skill in the art, however, will recognize that matrix multiplication is only one method for generating the one-dimensional inverse transform and that other algorithms, as described above, may be alternatively utilized.

Preferably, in accordance with the aforementioned example, the matrices utilized in both the one- and two-dimensional transformations are normalized as well as orthogonal. Therefore, it will be appreciated that the column matrix calculated by the column matrix calculator 1035 utilizing the orthogonal matrix is already in a form suitable for driving the columns of the active-addressed LCD 100.

In conventional active-addressed LCDs, as discussed briefly in the Background of the Invention herein above, the row signals for driving the rows of an LCD are orthonormal functions independent of the image data. The column signals for driving the columns of the LCD 100 are generated as a linear combinations of all row signals and the image data. The column signals, then, may be generated by performing a one-dimensional transform of image data utilizing the orthonormal row functions and thereafter adding rms correction factors calculated from the image data.

It will be appreciated, therefore, that because orthonormal matrices are used to compress the image data in the base station 505, the data communication receiver 510 can conveniently generate column signals, which are represented by the calculated column matrix, without ever decompressing the image data in a conventional manner.

In conventional devices for receiving and displaying compressed image data, a receiver generally receives image data which has been compressed in a two-dimensional transformation not necessarily performed using orthogonal or normalized functions. The image data is typically then decompressed in a two-dimensional inverse transformation to recover the image data. The decompression process, if matrix multiplication is involved, is given by the following equation:

$$I = 1/M * I_{2D} * 1/M,$$

wherein I represents the recovered image data, $I_{2D}$ represents the compressed image data, and M represents the matrix utilized to compress the data. Thereafter, the image data is provided, after processing, to a display device for displaying an image. In active-addressed LCDs, column signals dependent on the image data would be generated by utilizing orthogonal functions independent of the image data, i.e., $$CS = OM * I + CF_{rms},$$

wherein CS represents the column signals, OM is a matrix representing the orthogonal functions, and $CF_{rms}$ represents rms correction factors dependent on the image data.

It may be appreciated that the conventional processes of decompressing the image data then processing the image data to actively address a display device are fairly complex and involve a large number of calculation. If hardware were used to implement the above calculations, a substantial amount of circuitry could be involved, thereby increasing the size of a communication device utilizing the circuitry. If a software implementation of the above calculations was developed, the calculations could be very time consuming and could require a large amount of memory. Neither of these implementations, therefore, may be suitable for a portable radio device, such as the data communication receiver 510, in which both space and memory are limited. Furthermore, because the performance of the complex calculations, either in software or hardware, would increase current consumption, it would be undesirable to implement the above described calculations in the data communication receiver 510, which is preferably battery powered.

As can be seen by now, the very simple one-dimensional transformation of the compressed data, which is described above in reference to FIG. 10, is much more suitable than prior art approaches for use in the data communication receiver 510, which is used to receive compressed image data for driving the LCD 100. In the data communication receiver 510, only one calculation is performed on the compressed image data to derive the column signals for driving the LCD 100. The calculation, if matrix multiplication is involved, is represented by the following equation:

$$CS = OM * I_{2D} + CF_{rms},$$

wherein CS represents the column signals, $I_{2D}$ represents the two-dimensional transformed image data, OM represents the orthogonal matrix, and $CF_{rms}$ represents the rms correction factors.

This calculation can be performed using a minimum of hardware, resulting in a data communication receiver 510 which does not need to be considerably increased in size. Additionally, the battery life of the data communication receiver 510 will be only minimally affected. As a result, the data communication receiver 510, which may be, for example, a pager, is not too large and bulky to meet consumer requirements.

Returning to FIG. 10, the data communication receiver 510 further comprises a digital-to-analog (D/A) converter 1040 for converting the column signals into analog column voltages and column drivers 1045 coupled to the D/A converter 1040 for providing the column voltages to the LCD 100. Row drivers 1050 coupled to the controller 1025 drive, in accordance with conventional active addressing methods, the rows of the LCD 100 with the orthonormal junctions generated by the orthonormal matrix generator 1030. The D/A converter 1040, column drivers 1045, and the row drivers 1050 can be implemented using the following components:

| element | Model No. | Manufacturer |
| --- | --- | --- |
| D/A converter 1040 | CXD1178Q | Sony Corporation |
| column drivers 1045 | SED1779D0A | Seiko Epson Corp. |
| row drivers 1050 | SED1704 | Seiko Epson Corp. |

Figure 11:
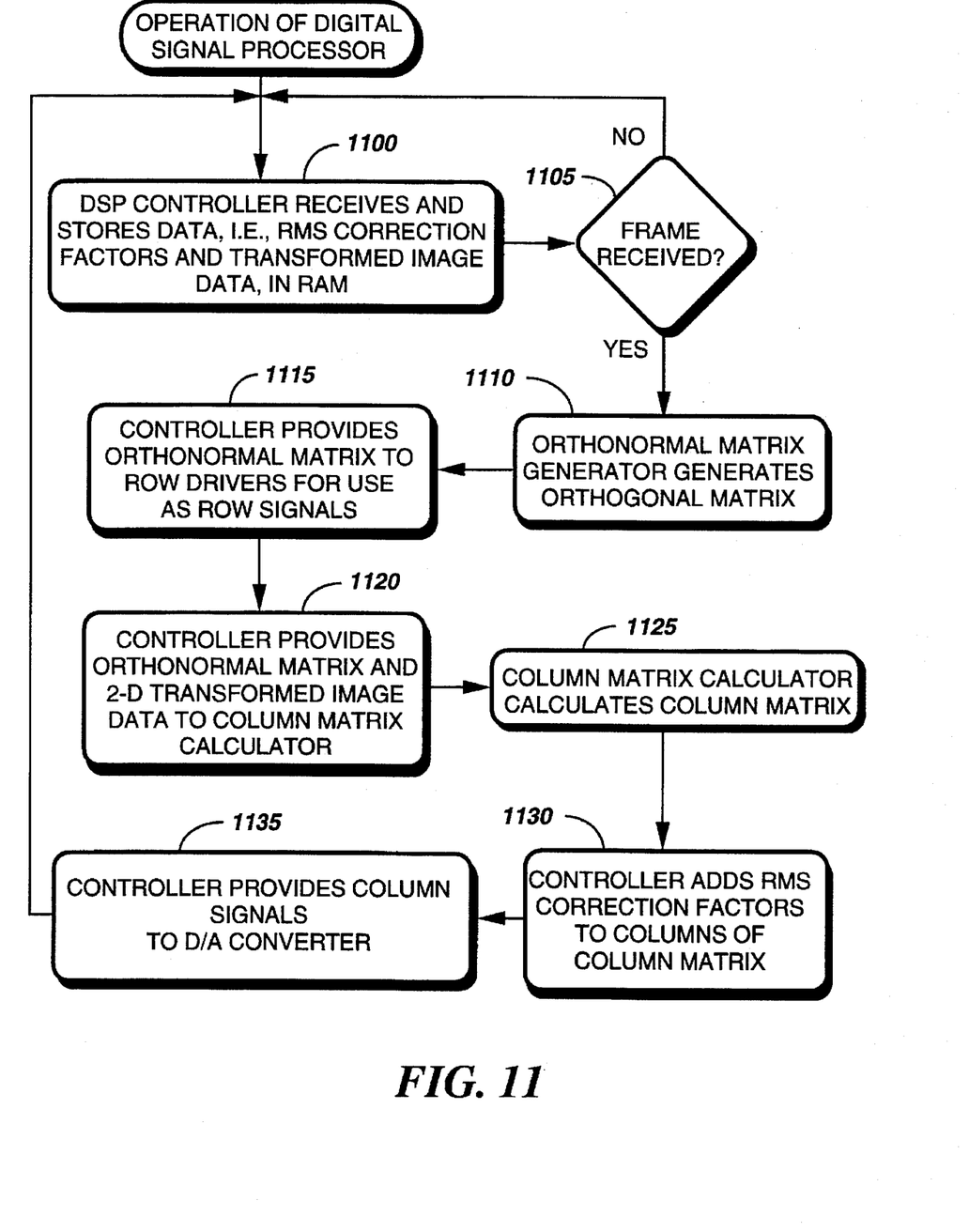
FIG. 11 is a flow chart depicting the operation of a digital signal processor included in the data communication receiver of FIG. 10 in accordance with the present invention.

Referring next to FIG. 11, a flow chart depicts the operation of the DSP 1037 in accordance with the preferred embodiment of the present invention. As described above, the controller 1025 of the DSP 1037 receives and stores, at step 1100, the rms correction factors and the two-dimensional transformed image data in the RAM 1020, preferably until, at step 1105, an entire frame of data is received, although it will be appreciated that processing of the incoming data could alternatively be performed as the data is received. Thereafter, the orthonormal matrix generator 1030 generates, at step 1110, orthonormal functions in the form of an orthonormal matrix, which is provided to the controller 1025. The controller 1025 then provides, at step 1115, the orthonormal functions to the row drivers 1050 (FIG. 10) for use in driving the row electrodes 106 (FIG. 1) of the LCD 100. Additionally, the controller 1025 provides the two-dimensional transformed image data to the column matrix calculator 1035, which calculates, at step 1125, a column matrix subsequently provided to the controller 1025. Next, the controller 1025 adds, at step 1130, the rms correction factors associated with the image data to the column matrix, thereby generating a plurality of column signals which are, at step 1135, provided to the D/A converter 1040. It will be appreciated by one of ordinary skill in the art that the row drivers 1050 and the column drivers 1045 drive the LCD 100 at approximately the same time, thereby actively addressing the LCD 100.

In summary, the communication system according to the present invention exploits the similarities between data compression and active addressing to reduce the complexity of a portable radio device, such as the data communication receiver described above. More specifically, the data communication receiver in accordance with the preferred embodiment of the present invention received compressed data, which is then transformed in a simple one-dimensional transform to generate column signals for driving the columns of an active-addressed LCD. In this manner, the data communication receiver avoids having to decompress the received image data. The data communication receiver, therefore, is smaller and drains less current than would a conventional radio device, which would normally first decompress received data and subsequently process the decompressed data to result in signals suitable for driving an active addressed LCD.

It may be appreciated by now that there has been provided a portable radio device in which compressed image data can be processed to generate signals suitable for actively addressing an LCD without increasing the size of the radio device due to required decompression and addressing circuitry. Additionally, reduction in the battery life of the radio device is minimized.

What is claimed is:

1. A method for generating signals for driving an rms-responding display included in a data communication receiver such that the rms-responding display is driven in accordance with active addressing techniques, the method comprising the steps of:

(a) receiving compressed data comprising at least original image data which has been previously compressed in a two-dimensional transformation utilizing a plurality of orthogonal functions;

(b) performing a one-dimensional transformation of the compressed data utilizing the plurality of orthogonal functions, wherein the one-dimensional transformation results in one-dimensional transformed image data;

(c) adding a plurality of correction factors to the one-dimensional transformed image data to generate column signals for driving a first portion of pixels included in the rms-responding display without further transforming the one-dimensional transformed image data to restore the original image data.

2. The method according to claim 1, further comprising the step of:

(d) driving a second portion of pixels included in the rms-responding display with the plurality of orthogonal functions.

3. The method according to claim 1, wherein step (b) comprises the steps of:

(e) multiplying the compressed data by a matrix representative of the plurality of orthogonal functions to generate the one-dimensional transformed image data.

4. A method for generating signals for driving an rms-responding display included in a data communication receiver such that the rms-responding display is driven in accordance with active addressing techniques, the data communication receiver coupled to a base station for receiving image data, the method comprising the steps of:

(a) the base station performing a two-dimensional transformation of the image data utilizing a plurality of orthogonal functions to result in compressed data;

(b) the base station transmitting an RF signal comprising at least the compressed data;

(c) the data communication receiver receiving the RF signal; and (d) the data communication receiver performing a one-dimensional transformation of the compressed data utilizing the plurality of orthogonal functions, thereby generating one-dimensional transformed image data utilized in generating column signals for driving the rms-responding display without further transforming the one-dimensional transformed image data to restore the image data.

5. The method according to claim 4, wherein step (a) comprises the steps of:

(e) the base station multiplying the image data by a matrix representative of the plurality of orthogonal functions to form an intermediate result; and (f) the base station multiplying the intermediate result by the matrix to generate two-dimensional transformed image data to result in the compressed data.

6. The method according to claim 5, wherein step (d) comprises the steps of:

(g) the data communication receiver multiplying the compressed data by the matrix to result in the one-dimensional transformed image data.

7. The method according to claim 4, wherein:

the method further comprises the step of:

(h) the base station calculating a plurality of correction factors dependent on the image data; and step (b) comprises the step of:

(i) the base station transmitting the RF signal, wherein the RF signal comprises the compressed data and the plurality of correction factors.

8. The method according to claim 7, wherein step (d) comprises the steps of:

(j) the data communication receiver performing the one-dimensional transformation on the compressed data utilizing the plurality of orthogonal functions to result in the one-dimensional transformed image data; and (k) the data communication receiver adding the plurality of correction factors to the one-dimensional transformed image data to result in the column signals that are generated without further transforming the one-dimensional transformed image data to restore the image data.

9. The method according to claim 8, further comprising the steps of:

(l) the data communication receiver driving a first portion of pixels included in the rms-responding display with the column signals; and (m) the data communication receiver driving a second portion of pixels included in the rms-responding display with the plurality of orthogonal functions.

10. A data communication receiver for receiving radio frequency (RF) signals and for displaying information contained therein on an rms-responding display which is driven in accordance with active addressing techniques, the data communication receiver comprising:

a receiver for receiving an RF signal comprising at least compressed data and a plurality of correction factors, the compressed data comprising original image data which has been previously compressed in a two-dimensional transformation utilizing a plurality of orthogonal functions;

transforming means coupled to the receiver for utilizing the plurality of orthogonal functions to perform a one-dimensional transformation on the compressed data, thereby generating one-dimensional transformed image data; and signal generating means coupled to the transforming means for adding the plurality of correction factors to the one-dimensional transformed image data to generate a plurality of column signals for driving a first portion of pixels included in the rms-responding display without further transforming the one-dimensional transformed image data to restore the original image data.

11. The data communication receiver according to claim 10, wherein the transforming means comprises:

function generating means for generating the plurality of orthogonal functions; and calculating means coupled to the function generating means for receiving the compressed data and the plurality of orthogonal functions and calculating therefrom the one-dimensional transformed image data.

12. The data communication receiver according to claim 10, wherein the transforming means comprises:

a matrix generator for generating a matrix representative of the plurality of orthogonal functions; and a column matrix calculator coupled to the matrix generator for receiving the compressed data and the matrix and calculating therefrom a column matrix representative of the one-dimensional transformed image data.

13. The data communication receiver according to claim 10, wherein the signal generating means comprises:

a controller for adding the plurality of correction factors to the one-dimensional transformed image data to result in the plurality of column signals;

first driving means coupled to the controller for driving the first portion of pixels with the plurality of column signals; and second driving means coupled to the controller for driving a second portion of pixels included in the rms-responding display with the plurality of orthogonal functions.

14. A communication system for transmitting and receiving radio frequency (RF) signals, the communication system comprising:

a base station for transmitting an RF signal including at least compressed data and a plurality of correction factors, the compressed data comprising a two-dimensional transformation of image data which has been compressed by the base station utilizing a plurality of orthogonal functions; and a data communication receiver coupled to the base station for receiving the RF signal and for generating one-dimensional transformed image data therefrom by performing a one-dimensional transformation of the compressed data utilizing the plurality of orthogonal functions, the data communication receiver comprising:

signal generating means for adding the plurality of correction factors to the one-dimensional transformed image data to generate a plurality of column signals; and an rms-responding display coupled to the signal generating means, the rms-responding display having a first portion of pixels which are driven by the plurality of column signals in accordance with active addressing techniques without further transforming the one-dimensional transformed image data to restore the image data.

15. The communication system according to claim 14, wherein the base station comprises:

image compression circuitry for receiving the image data and compressing the image data to result in the compressed data;

a correction factor calculator coupled to the image compression circuitry for calculating the plurality of correction factors from the image data; and a transmitter coupled to the image compression circuitry and the correction factor calculator for transmitting the RF signal comprising the compressed data and the plurality of correction factors.

16. The communication system according to claim 15, wherein the image compression circuitry included in the base station comprises:

an analog-to-digital converter for converting the image data to digital data;

function generating means for generating the plurality of orthogonal functions;

transforming means coupled to the analog-to-digital converter and the function generating means for utilizing the plurality of orthogonal functions to perform the two-dimensional transformation of the digital data, thereby generating two-dimensional transformed image data;

quantizing means coupled to the transforming means for quantizing the two-dimensional transformed image data; and an entropy coder coupled to the quantizing means for coding the two-dimensional transformed image data to generate the compressed data.

17. The communication system according to claim 14, wherein the signal generating means included in the data communication receiver comprises:

a controller for adding the plurality of correction factors to the one-dimensional transformed image data to result in the plurality of column signals;

first driving means coupled to the controller for driving the first portion of pixels with the plurality of column signals; and second driving means coupled to the controller for driving a second portion of pixels included in the rms-responding display with the plurality of orthogonal functions.

18. The communication system according to claim 16, wherein the data communication receiver further comprises:

receiving means for receiving the RF signal and decoding the two-dimensional transformed image data therefrom; and transforming means coupled to the receiving means for utilizing the plurality of orthogonal functions to generate the one-dimensional transformed image data from the two-dimensional transformed image data.

19. The communication system according to claim 18, wherein the receiving means comprises:

a receiver for receiving the RF signal and recovering therefrom the compressed data; and an entropy decoder for decoding the two-dimensional transformed image data from the compressed data.

20. The communication system according to claim 18, wherein the transforming means comprises:

function generating means for generating the plurality of orthogonal functions; and calculating means coupled to the function generating means for receiving the plurality of orthogonal functions and the two-dimensional transformed image data and calculating therefrom the one-dimensional transformed image data.

21. The communication system according to claim 18, wherein the transforming means comprises:

a matrix generator for generating a matrix representative of the plurality of orthogonal functions; and a column matrix calculator coupled to the matrix generator for receiving the two-dimensional transformed image data and the matrix and calculating therefrom a column matrix representative of the one-dimensional transformed image data.

* * * * *